(12) United States Patent
Elumalai (10) Patent No.: US 11,706,208 B2
(45) Date of Patent: Jul. 18, 2023

(54) METHOD AND APPARATUS FOR SECURING A REMOTE DEVICE

(71) Applicant: T-Mobile USA, Inc., Bellevue, WA (US)

(72) Inventor: Anbalagan Elumalai, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 156 days.

(21) Appl. No.: 16/998,723

(22) Filed: Aug. 20, 2020

(65) Prior Publication Data

US 2022/0060462 A1 Feb. 24, 2022

(51) Int. Cl.
*H04L 29/06* (2006.01)
*H04L 9/40* (2022.01)
*H04W 84/18* (2009.01)
*H04W 12/06* (2021.01)

(52) U.S. Cl.
CPC ......... *H04L 63/083* (2013.01); *H04W 12/068* (2021.01); *H04W 84/18* (2013.01)

(58) Field of Classification Search
CPC .......................... H04L 63/083; H04W 12/068
USPC ............................................................ 726/6
See application file for complete search history.

(56) References Cited

U.S. PATENT DOCUMENTS

| | | | |
|---|---|---|---|
| 9,467,838 B2 * | 10/2016 | Beyer, Jr. | H04W 76/15 |
| 10,219,135 B1 * | 2/2019 | Yau | H04L 63/083 |
| 2012/0208511 A1 | 8/2012 | Vanderlinden et al. | |
| 2013/0252585 A1 * | 9/2013 | Moshir | G06F 21/43 455/411 |
| 2013/0333004 A1 * | 12/2013 | Chang | H04L 63/10 726/5 |
| 2017/0109035 A1 | 4/2017 | Agarwal et al. | |
| 2017/0289788 A1 * | 10/2017 | Lalwaney | H04L 41/0803 |
| 2019/0327591 A1 | 10/2019 | Karimli et al. | |
| 2020/0193752 A1 | 6/2020 | Burris et al. | |
| 2022/0167161 A1 * | 5/2022 | Sheffield | H04W 12/37 |

* cited by examiner

*Primary Examiner* — Evans Desrosiers
(74) *Attorney, Agent, or Firm* — Summit Patents PC (57) ABSTRACT

A system and method for security of Internet of things (IoT) devices are discussed. A user of a mobile device, such as a customer of a wireless communication network, may remotely lock an IoT device while concomitantly assigning an ad hoc password to the IoT device that can be subsequently used to unlock the device. Alternatively, an IoT device may self-lock and produce a password in response to detecting its motion. The produced password may be provided to the user of a mobile device and used later to unlock the IoT device.

20 Claims, 8 Drawing Sheets

METHOD AND APPARATUS FOR SECURING A REMOTE DEVICE

BACKGROUND

In recent years, telecommunication devices have advanced from offering simple voice calling services within wireless communication networks to providing users with many features, such as email, text messaging, and access to various types of applications available to a mobile device via the Internet. Consumers have multiple telecommunication devices such as cellular phones, tablet computers, laptops, and other devices. Each device can have its own communication address, such as a telephone number, and can receive communications directed to any communication address associated with a service account. The convergence of multiple technologies, real-time analytics, machine learning, commodity sensors, and embedded systems have led to the Internet of Things, which may interact in various ways with such telecommunication devices.

The Internet of Things (IoT) is generally a system of interrelated computing devices, sensors, embedded systems, wireless sensor networks, control systems, automation (e.g., including home and building automation), and mechanical devices, to name a few examples, that are provided with unique identifiers (UIDs) and the ability to transfer data over a network without requiring human-to-human or human-to-computer interaction.

With strong growth in the number of IoT devices in the marketplace, IoT devices have become ubiquitous in modern daily life. Consequently, concerns regarding privacy and security of IoT devices have escalated. For example, a lost or stolen IoT device may be operated or manipulated by unauthorized persons, resulting in compromised data or control.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and architectures for providing security to remote or wireless devices, such as Internet of things (IoT) devices. In an implementation, for example, a customer (e.g., client) of a wireless communication network may, using a mobile device, remotely lock an IoT device while concomitantly assigning an ad hoc password to the device that can be subsequently used to unlock the device. The customer may choose to take such action if, for example, the IoT device has been lost or stolen. In some examples, the customer may remotely lock the IoT device and assign the password to the device from a mobile device, such as a cellular or smart phone. In these examples, the customer need not call or otherwise contact a customer care representative, for example, of the wireless communication network to lock the IoT device. In particular, the mobile device of the customer may include an application programming interface (API) that is accessible to the customer, and allows the customer to lock the IoT device without needing to contact a customer care representative. For example, the API may transmit a locking request to a service provider of the IoT device. The API may also provide for the customer to choose a password (e.g., a PIN) that can be used later to unlock the device. Herein, locking a device refers to a technique of securing a device to prevent an unauthorized user from using or controlling the device, for example. Such a technique may involve affecting (e.g., reducing or eliminating) at least some functionality of the device so as to limit or prevent actions that the unauthorized user may otherwise take.

The "Internet of Things" (IoT) refers to the inter-networking of devices that are embedded with technologies that enable the devices to collect and exchange data via network(s). IoT devices can be embedded with software and network connectivity so that they can exchange data with other IoT devices, mobile phones, etc. For example, an IoT device may be an appliance, which can be a device that accomplishes a particular function. Appliances can include devices that perform household functions (e.g., washing machines, dryers, refrigerators, ovens, freezers, etc.), entertainment functions (e.g., televisions, video game consoles, sound systems, etc.), etc. A mobile device can also be considered an IoT device. Generally, an IoT device is not programmed with subscriber account information or a communication address at its point-of-sale. An IoT device may be a device that when sold at the point-of-sale, is not associated with a telecommunications service provider, a subscriber account, or communications address.

In some embodiments, a remote device, such as an IoT device, may receive, from a remote server, a command to at least partially inhibit functionality of the IoT device. Such a remote server may be a server of a wireless communication network or a server on the Internet. Herein, the word "remote" indicates a substantial physical distance between the entity that is remote and other entities that are interacting with it. For example, an IoT device may be considered remote with respect to the Internet, or more specifically, servers on the Internet. In another example, a server of the Internet or of a wireless communication network may be considered remote with respect to an IoT device, which is most likely not near such a server.

In addition to the command to at least partially inhibit functionality of the IoT device, the device may also receive, from the remote server, a password to be assigned to the IoT device, which subsequently stores the password. In response to receiving the command, the IoT device may execute the command to at least partially inhibit the functionality of the IoT device. For example, such functionality may include any of a number of aspects of normal operations of the IoT device. Inhibiting such functionality may result in the IoT device being inoperable or locked. In some cases, an IoT device that is locked may not operate (e.g., an off-state). In other cases, an IoT device that is locked may continue to operate (e.g., sense or collect and store data) but not respond to any user input (except for an unlocking password, as described below) and may prevent availability of data stored thereon, for example.

The password assigned to the IoT device, as mentioned above, may be used to unlock the device. For example, if the owner or manager of the IoT device recovers a lost or stolen IoT device that has been locked, as described above, the owner or manager may apply the password to the IoT device to unlock the device and return the device to full functionality.

In some embodiments, a server on a wireless communication network or on the Internet may receive, from a mobile device (e.g., of a customer or client), a request to lock an IoT device. As mentioned above, locking the device at least partially inhibits functionality of the device. Upon or after receiving the request, the server may transmit to the IoT device a command to at least partially inhibit functionality of the IoT device. The server may also transmit to the IoT device a password to be assigned to the IoT device. The password, if later received subsequent to the IoT device being locked, allows the IoT device to return to full functionality. In some implementations, the server may receive a geolocation from the IoT device in response to the transmitting of the command. In response, the server may transmit the geolocation to the mobile device. In some implementations, the server may determine that the IoT device is moving based on received geolocation data (e.g., tracking data) from the IoT device. In response, the server may transmit a message to the mobile device that indicates such movement of the IoT device.

In other embodiments, an IoT device may detect its own motion (e.g., from geolocation data) and consequently transmit a message to be sent to a customer associated with the device. The customer may then choose to lock the device. For example, movement of the IoT device may indicate that it has been stolen or otherwise detrimentally moved. Upon detecting motion, the IoT device may lock itself and also self-assign a password that the IoT device transmits to be sent to the customer, who can later use this password to unlock the device.

Figure 1:
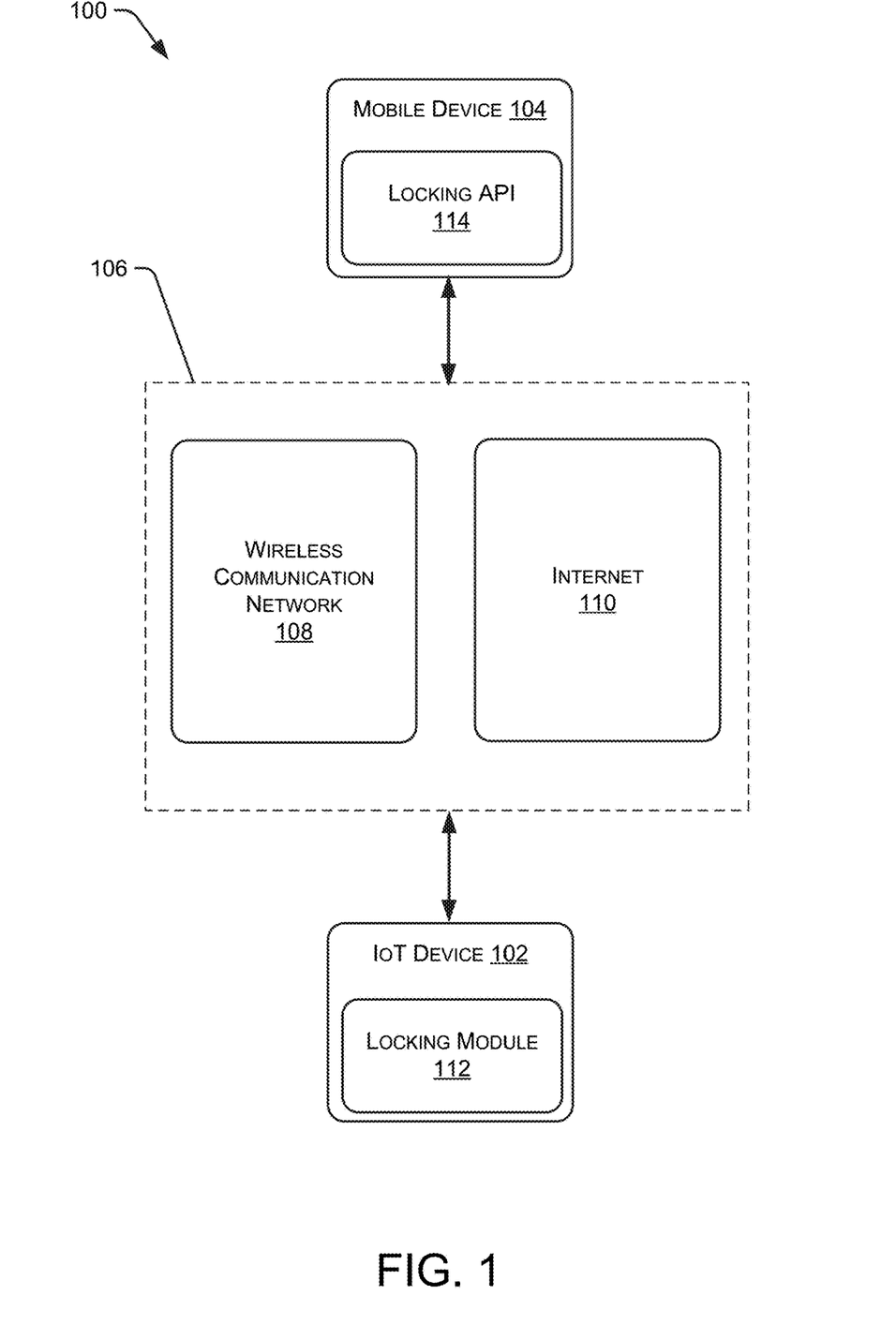
FIG. 1 is a block diagram of a system for remotely locking a device, according to various embodiments.

FIG. 1 is a block diagram of a system 100 for remotely locking a device 102 by using a mobile device 104, according to various embodiments. Device 102 may be a remote or wireless device, such as an IoT device, for example, and is identified as such in FIG. 1, though claimed subject matter is not so limited. Communication between device 102 and mobile device 104 may be implemented by a network server 106, which may comprise one or more servers in a wireless communication network 108 or the Internet 110. Device 102 may include a locking module 112, which may be software, hardware, or a combination thereof. Mobile device 104 may include a locking API 114 that provides for a user of mobile device 104 to selectively lock or unlock device 102.

Mobile device 104 may be associated with a telecommunications service provider and may have a profile associated with a subscriber identity module (SIM) card of the mobile device that indicates associated subscriber account information or a communication address associated with a telecommunications service provider.

In detail, telecommunication devices, such as mobile device 104, may be associated with SIM cards that store personal information of respective customers. A SIM card may be a portable memory chip or an embedded memory chip (eSIM). A SIM card associated with a telecommunication device can include data associated with a phone number of a customer associated with the telecommunication device, an address book of the customer, text messages sent and received via the telecommunication device, and other data. Generally, when a customer opens a service account associated with a telecommunication service provider, the telecommunication service provider can activate a SIM card of a telecommunication device associated with the service account of the consumer. That is, each SIM card includes a unique number on the memory chip requiring activation by the telecommunication service provider (e.g., via a website associated with the telecommunication service provider, via a call to the telecommunication service provider, etc.).

Embedded SIM (eSIM) cards are a relatively new generation of SIM cards that are embedded in devices, such as telecommunication devices. eSIM cards can have multiple applications, one which supports over the air provisioning of a profile which identifies the device in which the eSIM card is embedded to a telecommunications service provider. Currently, GSMA offers an eSIM remote provisioning specification which enables a profile on an eSIM card to be changed remotely without having to change the eSIM card itself. Device 102 may, but need not, include an eSIM card, which may not be easily removed.

Figure 2:
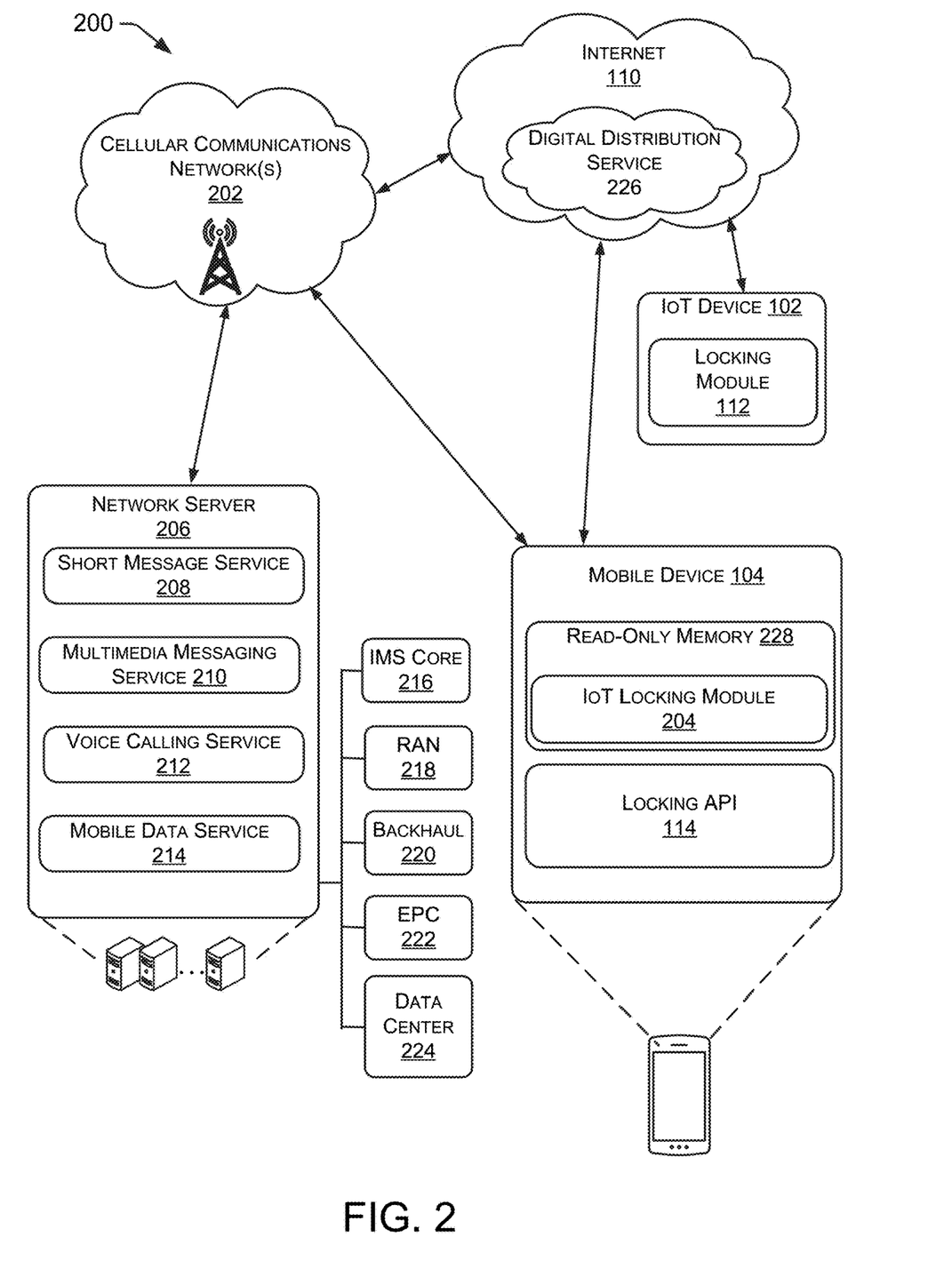
FIG. 2 schematically illustrates a system that includes a cellular communications network and the Internet, according to various embodiments.

FIG. 2 schematically illustrates a system 200 that includes a cellular communication network, according to various embodiments. System 200 provides an environment for a remote device, such as IoT device 102, to be locked or otherwise secured as a result of commands being transmitted by mobile device 104. Cellular communication network(s) 202 (e.g., "network") may be implemented by a cellular services provider. Cellular communication network 202 may be the same as or similar to wireless communication network 108, illustrated in FIG. 1. Mobile device 104 may communicate with one or more other electronic devices or systems via network 202. As described below, mobile device 104 may include an IoT locking module 204 to enable a user of the mobile device to lock IoT device 102 and set a password for later unlocking the IoT device.

A network server 206, which may comprise one or more servers, may provide operational equipment and infrastructure management in support of network 202. Network server 206 may provide back-end delivery and support of cellular network services including, for example, a short message service (SMS) 208, a multimedia messaging service (MMS) 210, a voice calling service 212, and a mobile data service 214.

Network server 206 may include or communicate with various types of operational equipment that support the cellular communications network, such as servers, routers, firewalls, hubs, switches, and so forth. Many of the operational equipment elements communicate over a non-cellular IP (Internet Protocol) network for purposes of control and reporting. Functions of network server 206 may be facilitated by, for example, an IMS (IP Multimedia Subsystem) Core 216, a RAN (Radio Access Network) 218, a Backhaul 220, an EPC (Evolved Packet Core) 222, and a data center 224. System 200 may include multiple instances of any of the illustrated network elements 216-224 or other elements that are not shown. System 200 may be distributed over a very large region, such as over an entire country or a portion of a country. System 200 may implement a GSM (global system for mobile communications) network, as one example.

System 200 may include at least portions of the Internet 110, such as those portions (e.g., the Cloud) that include (mobile) applications executed in response to communication with mobile device 104. Internet 110 may include a digital distribution service (DDS) 226 that procures mobile applications, such as an on-line digital store. For example, DDS 226 may sell, share, or distribute any number of applications that may be downloaded to mobile device 104, such as IoT locking module 204. In another example, DDS 226 may sell, share, or distribute locking module 112 that may be downloaded to IoT device 102. In some embodiments, DDS 226 may include processors that execute applications (e.g., in the Cloud) during engagement with mobile device 104, which may execute an associated application residing in mobile device 104. For example, mobile device 104, hosting IoT locking module 204 in a read-only memory 228, may utilize data storage and computing by servers in the Cloud.

Mobile device 104 may be configured to communicate on network 202 using network services 208-214, depicted with respect to network server 202. Accordingly, mobile device 104 may also include hardware and software supporting communications services such as a SMS, a MMS, a voice calling service, and a mobile data service, among other wireless access technologies. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, or any other previous or future generation of wireless access technology.

Although various elements of FIG. 2 are shown and described as being discrete devices or components for purposes of discussion, any of the illustrated computing elements may, in practice, include one or more physical, virtual, or otherwise abstracted cluster or network of machines or devices. For example, although network server 206 may be depicted as a single entity, it may comprise any one or more computing devices, including physical devices and virtual computing units, and including network-based devices that are commonly referred to as being in the cloud. Moreover, although a single mobile device (mobile device 104) is depicted, it should be appreciated that system 200 may include any number and types of mobile devices, and of such devices, mobile device 104 is merely a singular non-limiting example.

Figure 3:
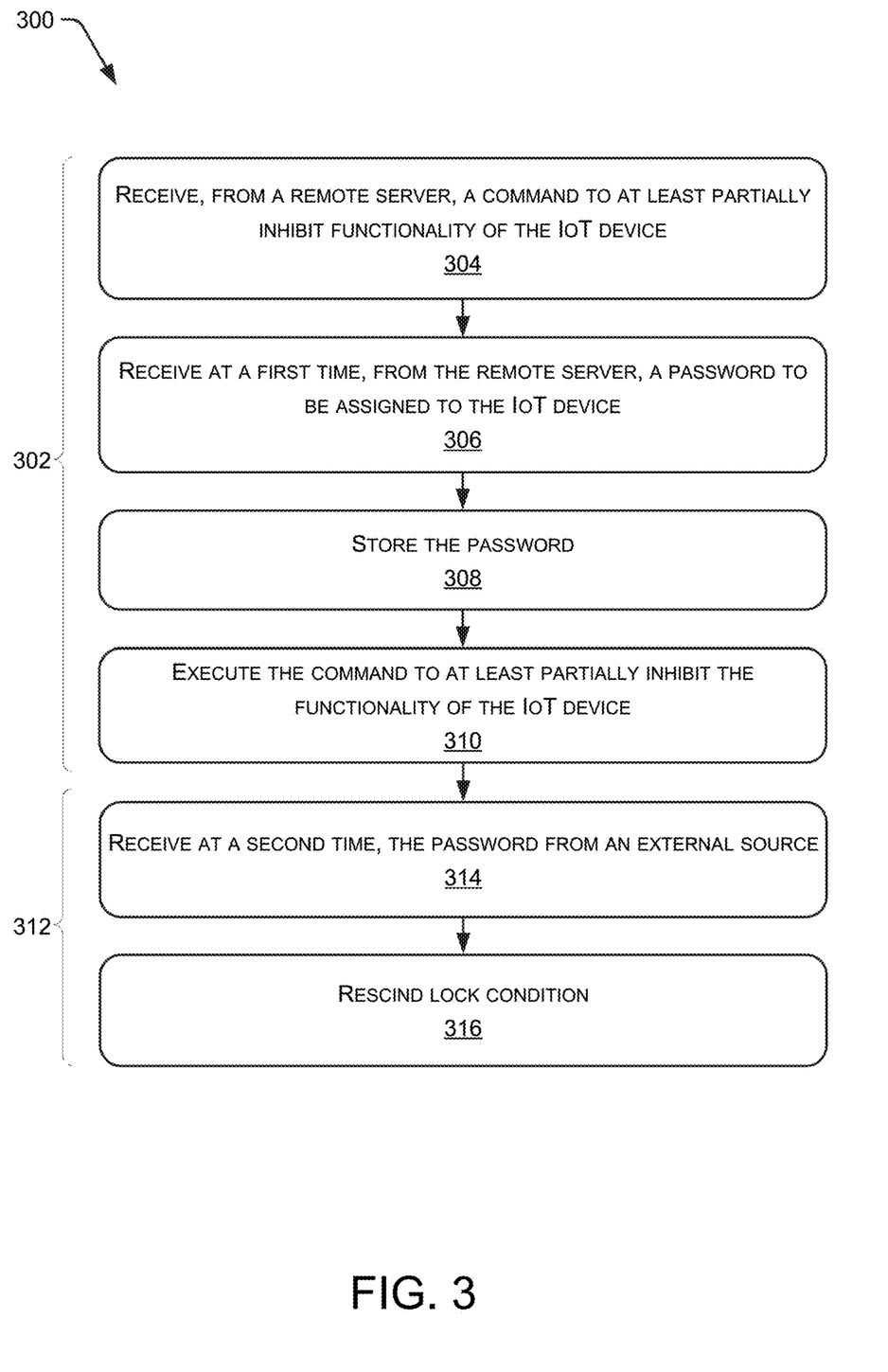
FIG. 3 is a flow diagram of a process of a remote device to respond to receiving information corresponding to controlling the security of the remote device, according to some embodiments.

FIG. 3 is a flow diagram of a process 300 involving a remote device, such as IoT device 102 in these examples, to respond to receiving information corresponding to controlling the security of the device, according to some embodiments.

The implementation of the various components described herein is a matter of choice dependent on the performance and other requirements of computing system involved. Accordingly, logical operations described herein may be referred to as operations, structural devices, acts, processes, or modules. These operations, structural devices, acts, processes, and modules can be implemented in software, in firmware, in special purpose digital logic, and any combination thereof. More or fewer operations can be performed than shown in the figures and described herein. These operations can also be performed in parallel, or in a different order than described herein. Some or all of these operations might also be performed by components other than those specifically identified. For example, process 300 may be performed in part by network server 206 or one or more servers associated with Internet 110, though claimed subject matter is not so limited.

Referring to FIG. 3, portion 302 of the flow diagram includes blocks 304 to 310 and corresponds to a description of process 300 that involves locking IoT device 102. On the other hand, portion 312 of the flow diagram includes blocks 314 and 316 and corresponds to a description of process 300 that involves unlocking IoT device 102.

At 304, IoT device 102 may receive, from a remote server (e.g., of wireless communication network 108 or Internet 110), a command to at least partially inhibit functionality of IoT device 102. For example, IoT device 102 may a priori have full functionality that is reduced by partially inhibiting some of the full functionality. Such functionality may include data collecting from sensors or other sources, displaying or transmitting information, processing information, and controlling other entities, just to name a few examples. At least partially inhibiting such functionality may be referred to as locking IoT device 102 (e.g., to be in a locked state). As explained below, a particular functionality of IoT device 102 associated with receiving and processing a password may remain while the IoT device is locked.

The command to at least partially inhibit functionality of IoT device 102, though received from a server of wireless communication network 108 or Internet 110 102, for example, may originate from mobile device 104 operated by a user (e.g., client or customer). In an example scenario, the user may choose to lock the IoT device after learning that the device has been lost or stolen, or may have another reason to lock the device. Mobile device 104 includes locking API 114 that presents, such as on a display of mobile device 104, options to lock or unlock a particular IoT device. In some implementations, in response to the user selecting the option to lock the device, the API may prompt the user to enter a password (e.g., a personal identification number (PIN)) or may generate a password and display it to the user. This password may be used to unlock the locked IoT device at a later time.

At 306, in addition to receiving the command to at least partially inhibit functionality of IoT device 102, the IoT device may receive, from the remote server, the password, mentioned above, which will be assigned to the IoT device. In relative terms, the password may be considered to be received at a first time, in contrast to when the password is subsequently received at a second time to unlock the IoT device, as described below. The command to at least partially inhibit functionality of IoT device 102 and the password may be received substantially simultaneously. At 308, the IoT device may store the password locally, such as in a memory device.

At 310, the IoT device may execute the command to at least partially inhibit the functionality of the IoT device. Such execution may be performed by locking module 112, illustrated in FIG. 1.

While IoT device 102 is in a locked state, at 314, the IoT device may receive at a second time (e.g., as compared to the earlier first time, mentioned above), the password from a source external to the IoT device. In an example scenario, the user may choose to unlock the IoT device after recovering possession or control of the device from being lost or stolen, or may have another reason to unlock the device. In one implementation, mobile device 104 may use locking API 114 to unlock the IoT device. In this case, the user may choose to unlock the IoT device by selecting such an option in API 114. In response, API 114 may transmit, via mobile device 104, the password to be received by the IoT device.

In response, locking module 112 of IoT device 102 may compare the received password to the password received at the first time and stored in memory. If the two passwords match then, at block 316, locking module 112 will unlock the IoT device. If the passwords are different from each other, the IoT device will remain locked.

In some implementations, the IoT device may transmit a geolocation, or any information indicative of the location or movement of the IoT device, to the remote server in response to receiving of the command to at least partially inhibit functionality of IoT device 102. In still other implementations, IoT device 102 may determine if the IoT device is moving. If so, the IoT device may transmit a message to the remote server that indicates such motion of the IoT device.

Figure 4:
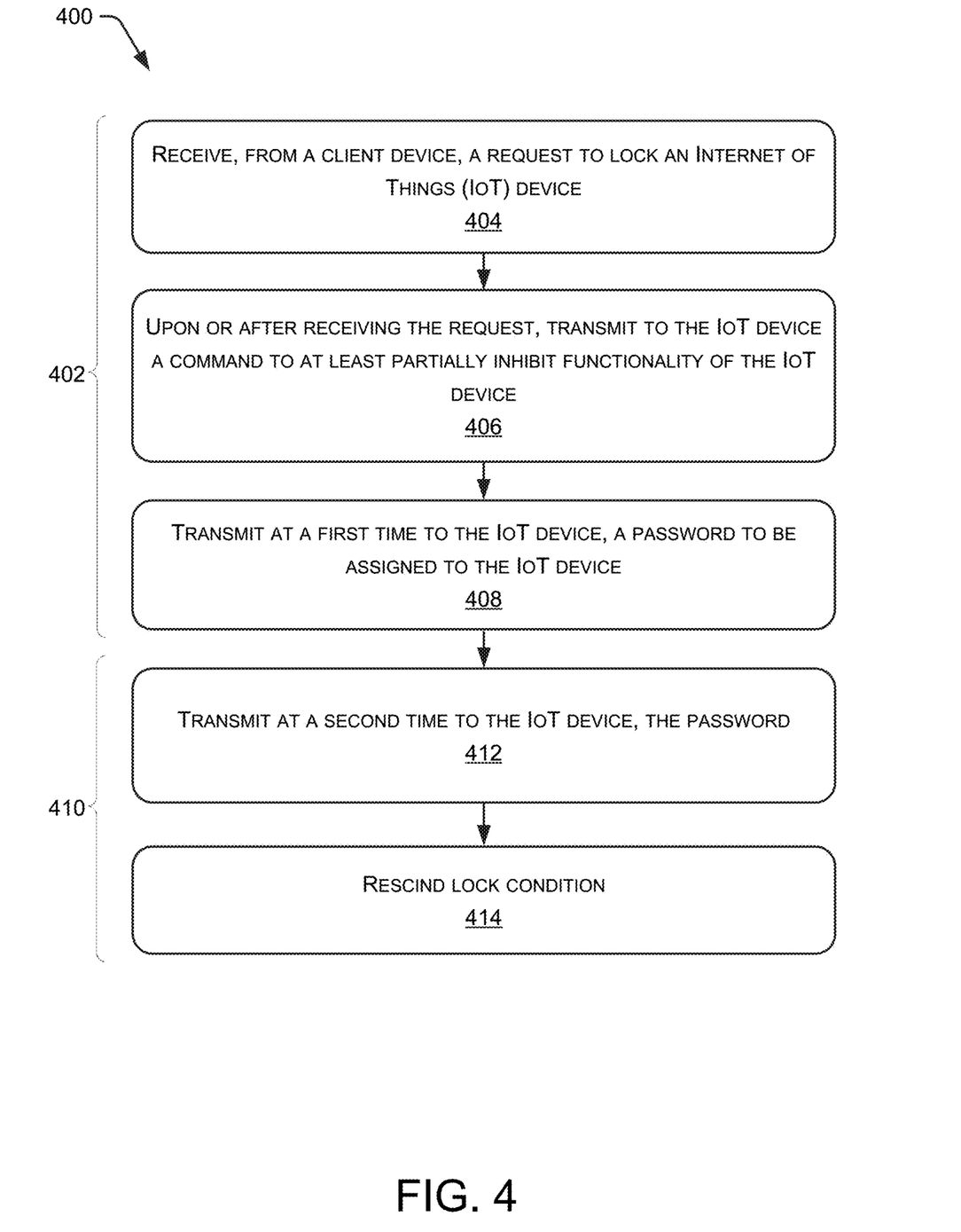
FIG. 4 is a flow diagram of a process of a server to control the security of a remote device, according to some embodiments.

FIG. 4 is a flow diagram of a process 400 of a server (e.g., network server 206 or one or more servers associated with Internet 110) to control, at the request of a client device (e.g., mobile device 104), the security of a remote device, such as IoT device 102 in these examples, according to some embodiments. Generally, process 400 performed by a network server, which is remote from IoT device 102, corresponds to process 300 performed by the IoT device.

Referring to FIG. 4, portion 402 of the flow diagram includes blocks 404 to 408 and corresponds to a description of process 400 that involves locking IoT device 102. On the other hand, portion 410 of the flow diagram includes blocks 412 and 414 and corresponds to a description of process 400 that involves unlocking IoT device 102.

At 404, the server may receive, from the client device, a request to lock IoT device 102. At 406, upon or after receiving the request, the server may transmit to the IoT device a command to at least partially inhibit functionality of the IoT device. In some implementations, the server may receive a response from the IoT device acknowledging that the IoT device has executed the command to at least partially inhibit the functionality of the IoT device. In still other implementations, the server may receive a geolocation, or any information indicative of the location or movement of the IoT device, from the IoT device in response to transmitting the command to at least partially inhibit functionality of IoT device 102. In still other implementations, the server may determine if the IoT device is moving. If so, the server may transmit a message to the client device that indicates such motion of the IoT device.

At 408, the server may transmit at a first time to the IoT device, a password to be assigned to the IoT device. In some examples, the password and the command to at least partially inhibit the functionality of the IoT device may be transmitted to the IoT device substantially simultaneously. In response to the server performing portion 402 of process 400, IoT device 102 may be locked.

At 412, in response to a request from the client device to unlock IoT device 102, the server may transmit at a second time to the IoT device the password so that, at 414, the server may rescind the lock condition of the IoT device.

Figure 5:
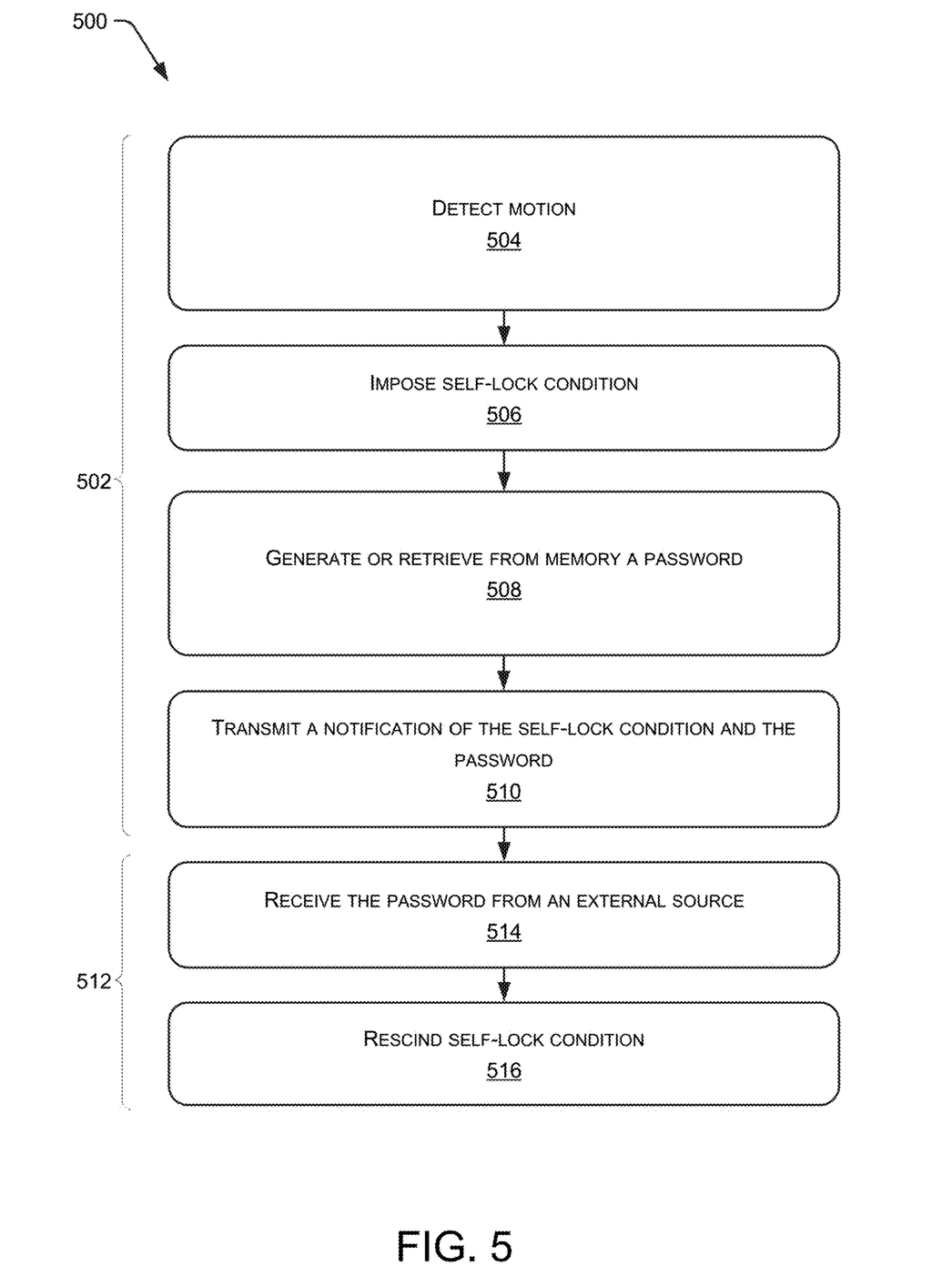
FIG. 5 is a flow diagram of a process of a remote device to self-lock in response to detecting its motion, according to some embodiments.

FIG. 5 is a flow diagram of a process 500 of a remote device to self-lock in response to detecting its motion, according to some embodiments.

Referring to FIG. 5, portion 502 of the flow diagram includes blocks 504 to 510 and corresponds to a description of process 500 that involves locking IoT device 102. On the other hand, portion 512 of the flow diagram includes blocks 514 and 516 and corresponds to a description of process 500 that involves unlocking IoT device 102.

At 504, IoT device 102 may detect motion. In other words, the IoT device may sense that it is moving or has been moved by receiving signals from any of a number of types of motion sensors, which may reside on the IoT device. In other implementations, the IoT device may detect such movement using geolocation data via GPS or signals received from access points, just to name a few examples.

At 506, in response to detecting its motion, IoT device 102 may impose a self-lock condition to at least partially inhibit functionality of the IoT device. At 508, the IoT device may generate or retrieve from its memory a password. For example, memory of the IoT device may store one or more passwords earlier selected by a user or manager of the IoT device. In another example, the IoT device may use a random number generator to generate such a password. As part of placing itself in a self-lock condition, this password may be provided to the user or manager of the IoT device to be used later to unlock the IoT device.

At 510, the IoT device may transmit, via a remote server, a notification of the self-lock condition of the IoT device and the password to a mobile device (e.g., client device) of the user or manager of IoT device 102.

In response to the server performing portion 502 of process 500, IoT device 102 may be locked and the user or manager of IoT device 102 informed of such state of the IoT device. At a later time, the user or manager, choosing to unlock the IoT device, may use the mobile device to transmit the password to the IoT device. Accordingly, at 514, IoT device 102 may receive, via the remote server, the password from the mobile device or from another external source. In response to receiving the password, at 516, the IoT device may rescind its lock condition.

Figure 6:
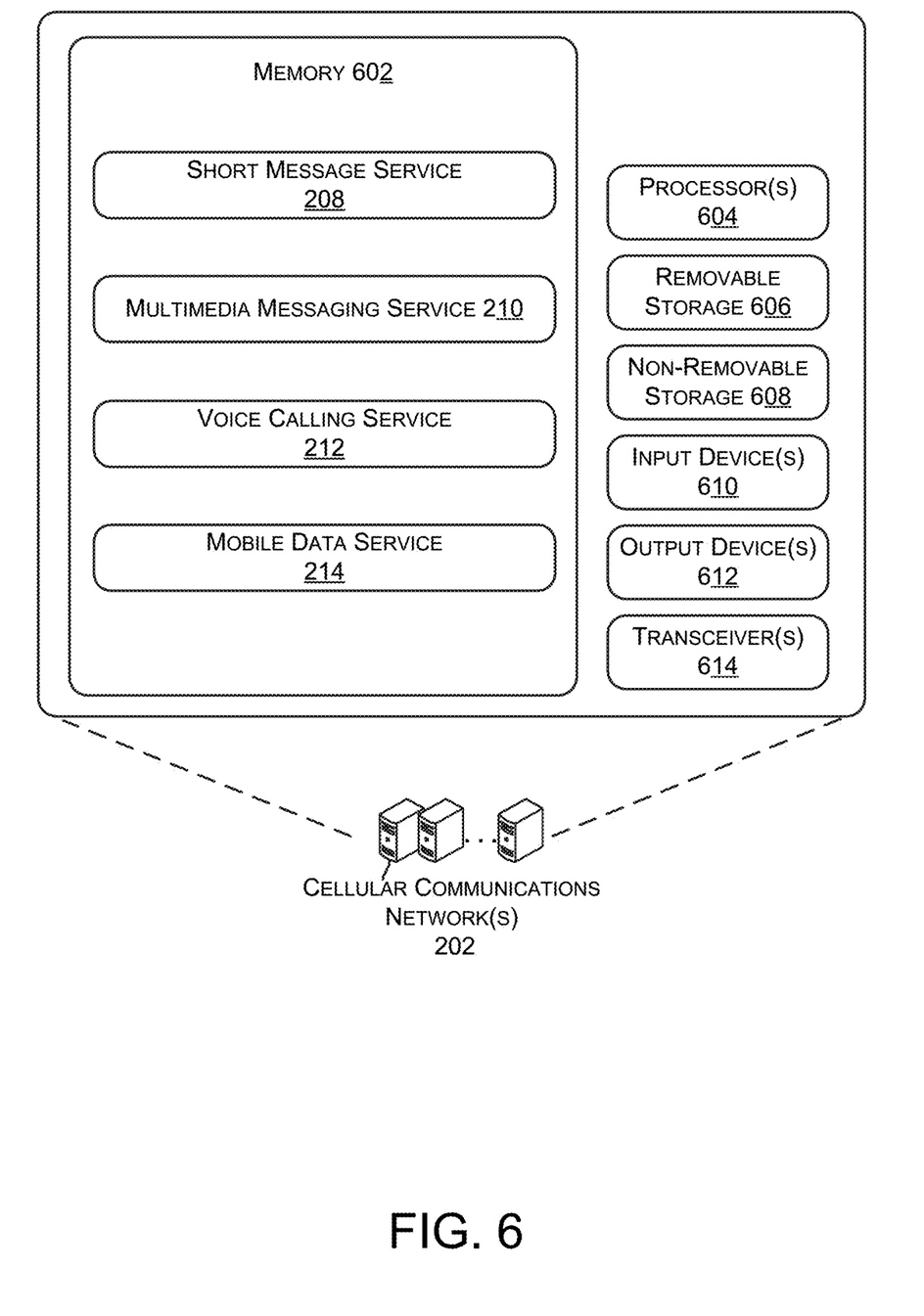
FIG. 6 is a block diagram of a network server, according to various embodiments.

FIG. 6 is a block diagram of cellular communication network(s) 202 (hereinafter, network 202), first illustrated in FIG. 2, configured to operate with IoT device 102 and locking API 114 residing on mobile device 104, according to various embodiments. For example, network 202 may be used to implement the various operations described herein. Network 202 may be implemented as a single device or as a plurality of devices with modules and data distributed among them. Network 202 may include memory 602 storing executable code and data for SMS 208, MMS 210, voice calling service 212, and mobile data service 214, as described herein. Network 202 includes one or more processor(s) 604, a removable storage 606, a non-removable storage 608, input device(s) 610, output device(s) 612, and transceiver(s) 614.

In various embodiments, memory 602 may be volatile (such as RAM), non-volatile (such as ROM, flash memory, etc.), or some combination thereof. SMS 208, MMS 210, voice calling service 212, and mobile data service 214 may comprise methods, threads, processes, applications, or any other sort of executable instructions. SMS 208, MMS 210, voice calling service 212, and mobile data service 214 may also include files and databases (not illustrated) storing values associated with expected or nominal settings, values, etc., for the various services described. Various details of SMS 208, MMS 210, voice calling service 212, and mobile data service 214 are provided above in the discussion of FIG. 2.

In some embodiments, one or more processor(s) 604 are central processing units (CPUs), graphics processing units (GPUs), or both CPU and GPU, or other processing units or components known in the art. One or more processor(s) 604 may include a flow controller (not illustrated) to manage execution of executable code.

Network(s) 202 may include additional data storage devices (removable or non-removable) such as, for example, magnetic disks, optical disks, or tape. Such additional storage is illustrated in FIG. 5 by removable storage 606 and non-removable storage 608. Tangible computer-readable media can include volatile and non-volatile, removable and non-removable media implemented in any method or technology for storage of information, such as computer readable instructions, data structures, program modules, or other data. Memory 602, removable storage 606, and non-removable storage 608 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by network 202. Any such tangible computer-readable media can be part of network 202.

Network 202 also can include input device(s) 510 such as a keypad, a cursor control, a touch-sensitive display, voice input device, etc., and output device(s) 512 such as a display, speakers, printers, haptic feedback, etc.

As illustrated in FIG. 6, network 202 may also include one or more wired or wireless transceiver(s) 614. Transceiver(s) 614 can include a network interface card (NIC), a network adapter, a LAN adapter, or a physical, virtual, or logical address to connect to cellular network(s), Wi-Fi network(s), OEM server(s), IoT device 102, and mobile device 104, for example. To increase throughput when exchanging wireless data, transceiver(s) 614 can utilize multiple-input/multiple-output (MIMO) technology. Transceiver(s) 614 may embody any sort of wireless transceiver device capable of engaging in wireless, radio frequency (RF) communication. Transceiver(s) 614 may also include other wireless modems, such as a modem for engaging in Wi-Fi, WiMAX, Bluetooth, or infrared communication.

Figure 7:
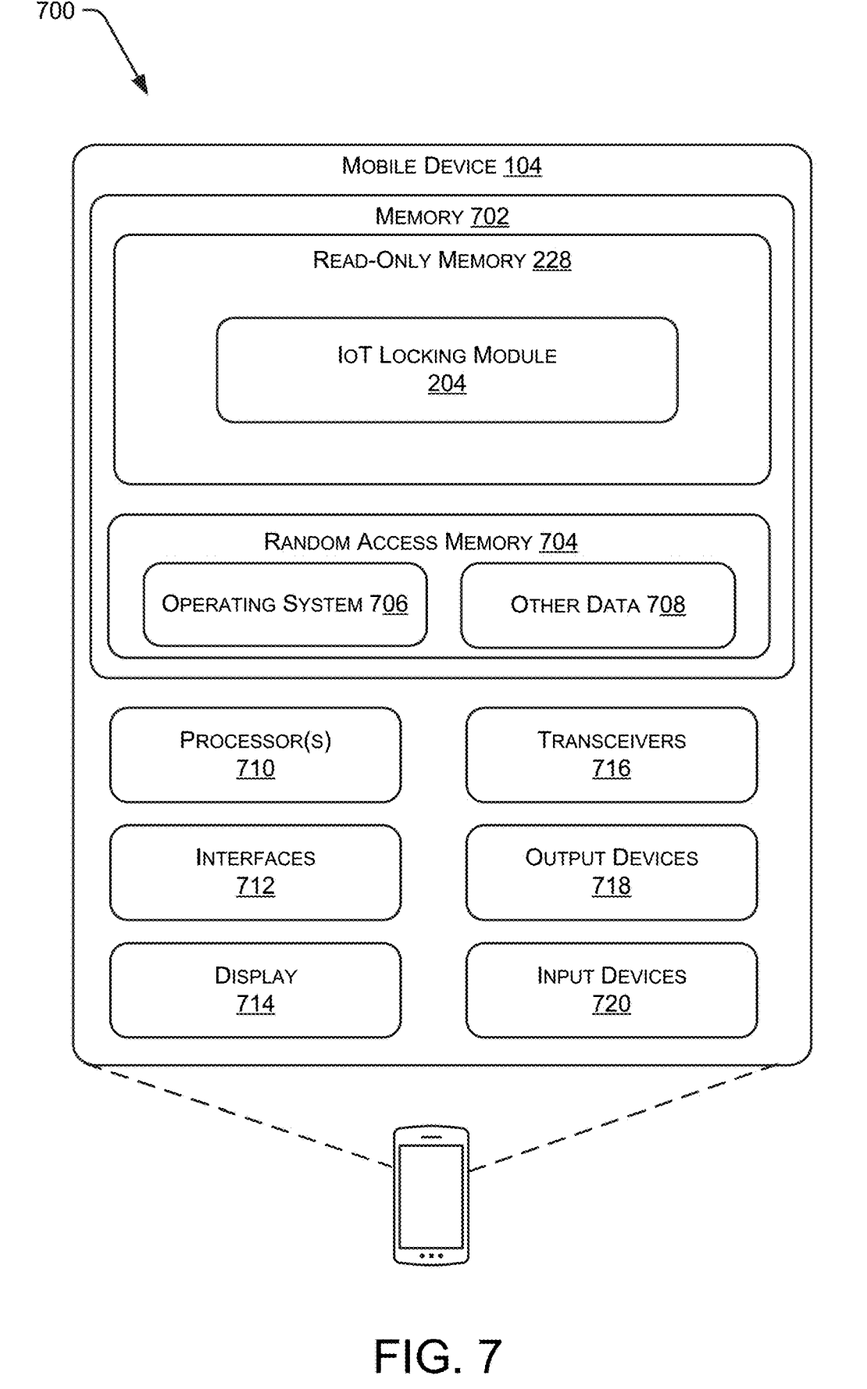
FIG. 7 is a block diagram of a mobile device, according to various embodiments.

FIG. 7 is a block diagram of mobile device 104 and illustrates a component level view of mobile device 104 configured with locking API 114, according to various embodiments. Mobile device 104 may include a system memory 702 that includes ROM 228 and a RAM 704. ROM 228 may store IoT locking module 204, which may comprise one or more individual applications, and may operate locking API 114. For example, locking module 204 may comprise code executable by mobile device 104 to perform locking or unlocking processes for an IoT device, as described above.

In some examples, IoT locking module 204 may be configured to work with various services on network 202, such as, for example, a short message service (SMS), a multimedia messaging service (MMS), a voice calling service, and a mobile data service, which may communicate with and or otherwise share information with corresponding services on network 202 including SMS 208, MMS 210, voice calling service 212, or mobile data service 214. For example, IoT locking module 204 may use such services to communicate to IoT device 102.

RAM 704 may include working memory that stores information such as an operating system 706, and other data 708. Other data 708 may include application(s) such as voice calling clients, VoLTE calling clients, Wi-Fi calling clients, messaging applications, email applications, media player applications, video calling applications, video chat applications, web browsers, social media applications, any sort of real-time communication applications, or any other sort of applications. The application(s) embodied as other data 708 may engage in communication with other applications, servers, or devices via a communication link over a network (e.g., the cellular network(s) 202, the Internet, or Wi-Fi network(s)), sending and receiving data packets.

ROM 228 and RAM 704 can include non-transitory computer-readable media (which may be non-volatile and volatile, respectively), and may include removable and non-removable tangible, physical media implemented in technology for storage of information, such as computer readable instructions, data structures, program modules, or other data. System memory 702 (and removable storage 606 and non-removable storage 608 as illustrated in FIG. 6) are examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by mobile device 104. Any such non-transitory computer-readable media may be part of mobile device 104, network 202, or other components of system 200.

Mobile device 104 may further include processor(s) 710 which, in some implementations, may be one or more central processing units (CPUs), graphics processing units (GPUs), or both CPUs and GPUs, or any other sort of processing unit.

Mobile device 104 may further include one or more interfaces 712, a display 714, transceivers 716, output device(s) 718, and input device(s) 720. In some implementations, transceivers 716 may include radios or modems, or combinations thereof known in the art. For example, transceivers 716 may include one or more radio transceivers that performs the function of transmitting and receiving radio frequency communications via an antenna (not shown). The radios or modems may facilitate wireless connectivity between mobile device 104 and various devices or one or more networks (e.g., 202). In addition, transceivers 716 may include a near field antenna for communicating over unlicensed wireless IP networks, such as local wireless data networks and personal area networks (e.g., Bluetooth or near field communication (NFC) networks). Further, transceivers 716 may include wired communication components, such as an Ethernet port, that connect the mobile device 104 in a wired fashion to devices of one or more networks. In various implementations, transceivers 716 may interface with and be controlled by a radio chipset (not shown).

In some implementations, output devices 718 include any sort of output devices known in the art, such as a display (e.g., a liquid crystal display), speakers, a vibrating mechanism, or a tactile feedback mechanism. Output devices 718 also include ports for one or more peripheral devices, such as headphones, peripheral speakers, or a peripheral display.

In various implementations, input device(s) 720 include any sort of input devices known in the art. For example, input device(s) 720 may include a camera, a microphone, a keyboard, keypad, or a touch-sensitive display. A keyboard or keypad may be a push button numeric dialing pad (such as on a typical telecommunication device), a multi-key keyboard (such as a conventional QWERTY keyboard), or one or more other types of keys or buttons, and may also include a joystick-like controller or designated navigation buttons, or the like.

Figure 8:
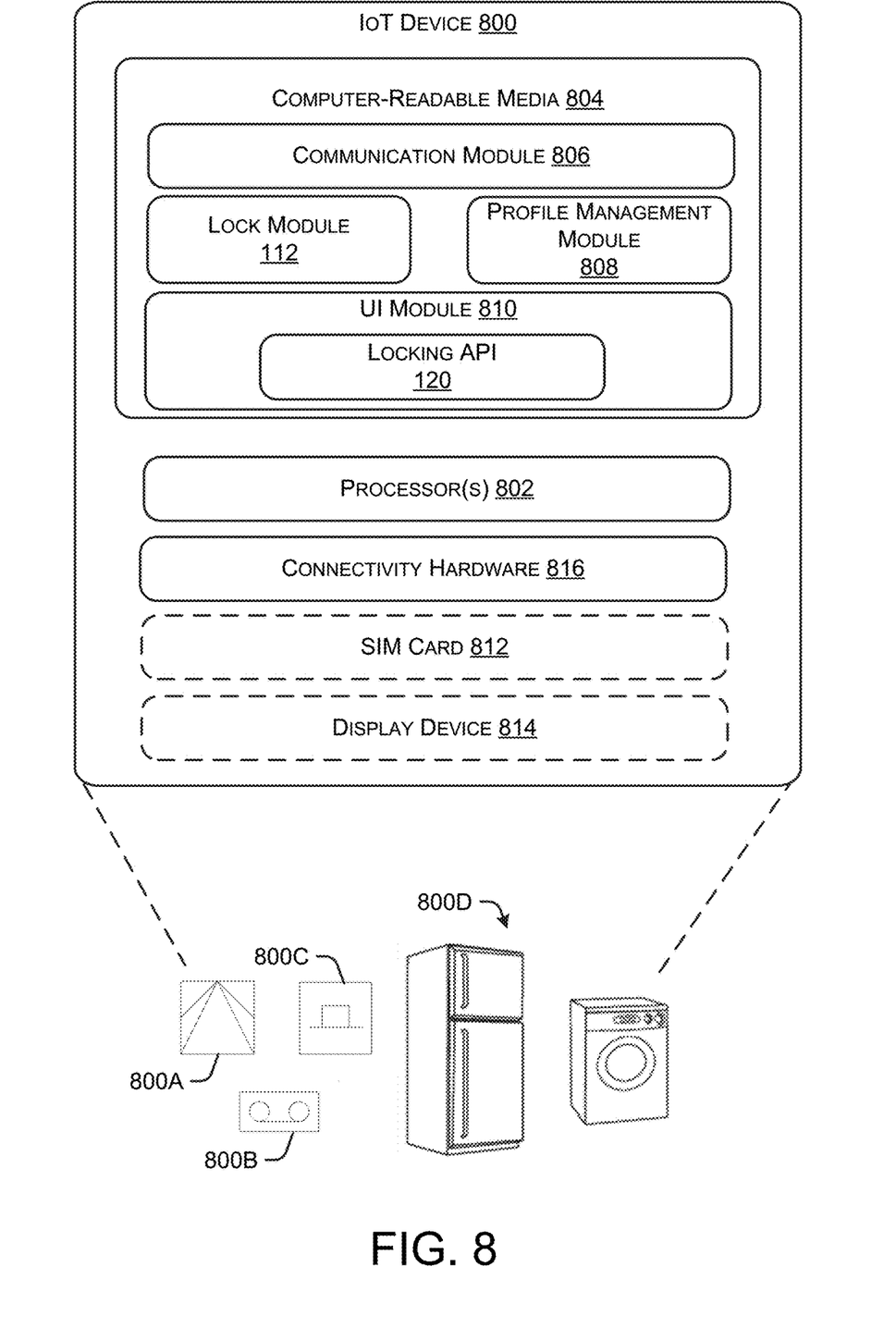
FIG. 8 is a block diagram of an Internet of Things (IoT) device, according to various embodiments.

FIG. 8 is a block diagram of an IoT device 800 configured to be locked or unlocked at the request of a remote device, such as mobile device 104, according to various embodiments. IoT device 800 may be similar to or the same as IoT device 102, illustrated in FIG. 1. As illustrated in FIG. 8, IoT device 800 may comprise any of a number of types of IoT devices, such as a motion sensor 800A, a data recorder 800B, a transducer 800C, and various appliances 800D, just to name a few examples.

IoT device 800 may include processor(s) 802 and computer-readable media 804. Processor(s) 802 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, processor(s) 802 can execute one or more modules or processes to cause IoT device 800 to perform a variety of functions, as set forth above and explained in further detail in the following disclosure. Additionally, each of processor(s) 802 can possess its own local memory, which also can store program modules, program data, or one or more operating systems.

Depending on the exact configuration and type of IoT device 800, computer-readable media 804 can include computer storage media or communication media. Computer storage media can include volatile memory, nonvolatile memory, or other persistent or auxiliary computer storage media, removable and non-removable computer storage media implemented in any method or technology for storage of information such as computer readable instructions, data structures, program modules, or other data. Computer memory is an example of computer storage media. Thus, computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 804 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by IoT device 800. Any such non-transitory computer-readable media can be part of IoT device 800.

In contrast, communication media includes computer readable instructions, data structures, program modules, or other data in a modulated data signal, such as a carrier wave, or other transmission mechanism. As defined herein, computer storage media does not include communication media.

Computer-readable media 804 can include one or more modules and data structures including, for example, a communication module 806, lock module 112, a profile management module 808, or a user interface (UI) module 810, which may include locking API 120. The one or more modules and data structures can be in the form of stand-alone applications, productivity applications, an operating system component, or any other application or software module having data items that facilitate interactions between related devices, external device(s), or one or more networks (e.g., cellular network 202, Internet 110, and other network(s), as described herein.

Communication module 806 can facilitate communications between the IoT device 800 and one or more other related devices, or an external device such as remote servers. For example, communication module 806 can facilitate sending calls, messages, etc. to one or more other related devices or an external device. Communication module 806 can facilitate receiving calls, messages, etc. from one or more other related devices or an external device.

Profile management module 808 can provide local profile services such as downloading data to add to a profile associated with a SIM card 812 or managing the profile. In at least one example, IoT device 800 can include a SIM card, though an IoT device need not include a SIM card. Dashed blocks in FIG. 8 indicate elements that need not be included in IoT device 800. As described above, SIM card 812 can be an eSIM card. In such examples, the eSIM card can be associated with a profile that can be programmed by a remote device (e.g., another device or server(s)). The profile can be used to identify (and authenticate) IoT device 800. In at least one example, profile management module 808 can receive profile data associated with the eSIM card from a remote device. The profile data can indicate operator information, telecommunications service provider information, etc. Profile management module 808 can receive profile data and can store the profile data in association with the profile of the eSIM card. Furthermore, as described herein, in at least one example, profile management module 808 can receive data associated with a subscriber account, a communication address, etc. from a remote device and can associate such data with the profile.

In at least some examples, IoT device 800 can include UI module 810, as described above. IoT devices such as televisions, refrigerators, etc. can, but need not, include a display device 814 for presenting content to users. In such examples, UI module 810 can be configured to cause a presentation of graphical representation(s) via display device 814 associated with IoT device 800. In at least one example, UI module 810 can generate a graphical user interface, such as locking API 120, that can be presented via display device 814. Display device 814 can be an output device for visually presenting data. Examples of display devices include light emitting diode (LED) displays, liquid crystal displays (LCD), cathode ray tube (CRT) displays, etc.

In some examples, IoT device 800 may include connectivity hardware 816 that includes network hardware, which provides wired or wireless networking capabilities to IoT device 800. The network hardware can include or be incorporated into processors, application-specific integrated circuits (ASICs), programmable circuits such as field programmable gate arrays (FPGAs), or in other ways. The software modules stored on computer-readable media 804 are configured to access hardware via interrupts, calling APIs, and the like. The software modules can also be configured to pass information to one another, such as through APIs, storing commands, parameters, etc. in a predetermined memory location, etc. Other examples are possible without departing from the scope of this disclosure.

In additional and alternate examples, connectivity hardware 816 can include radio hardware, which provides wireless UE capabilities, such as connecting to a cellular network base station, a Wi-Fi network, or other wireless networks. The radio hardware can include or be incorporated into processors, application-specific integrated circuits (ASICs), programmable circuits such as field programmable gate arrays (FPGAs), or in other ways. The software modules stored on the computer-readable media 804 are configured to access hardware via interrupts, calling APIs, and the like. The software modules can also be configured to pass information to one another, such as through APIs, by storing commands, parameters, etc. in a predetermined memory location, etc. Other examples are possible without departing from the scope of this disclosure.

CONCLUSION

Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

The invention claimed is:

1. A remote server configured to communicate with a client device and an Internet of Things (IoT) device, the remote server comprising:
    a processor;
    a non-transitory storage medium; and
    instructions stored in the non-transitory storage medium, the instructions being executable by the processor to:
        in response to receiving a user command from the client device to lock the IoT device, create and assign an ad hoc password to the IoT device;
        remotely change a profile on an eSIM card embedded in the IoT device by transmitting to the IoT device i) a command to reduce full functionality of the IoT device by at least partially inhibiting functionality of the IoT device and ii) the ad hoc password;
        receive a response from the IoT device acknowledging that the remote device has executed the command to at least partially inhibit the functionality of the IoT device;
        transmit to the IoT device i) a command to return to the full functionality of the IoT device and ii) the ad hoc password; and
        receive a geolocation from the IoT device in response to the transmitting of the command to return to the full functionality of the IoT device.

2. The remote server of claim 1, wherein the command to at least partially inhibit the functionality of the IoT device and the ad hoc password are transmitted substantially simultaneously to the remote server.

3. The remote server of claim 1, wherein the instructions are further executable by the processor to:
    receive a message from the IoT device indicating that the IoT device is moving; and
    in response to receiving the message, transmit a notifying message to the client device that indicates motion of the IoT device.

4. The remote server of claim 1, wherein the at least partially inhibiting the functionality of the IoT device comprises locking the IoT device.

5. The remote server of claim 1, wherein the remote server comprises a portion of a wireless communication network.

6. The remote server of claim 1, wherein the remote server comprises a portion of the Internet.

7. The remote server of claim 1, wherein the instructions are further executable by the processor to receive from the IoT device a message that includes
    an indication that the IoT device is moving,
    an indication that the IoT device has self-locked in response to the moving, and
    a password self-assigned by the IoT device in response to the self-locking.

8. One or more non-transitory computer-readable media storing computer-executable instructions that, when executed by a processor of a network element, cause a flow controller of the network element to perform operations comprising:
    receiving, from a client device, a request to inhibit functionality of an Internet of Things (IoT) device from full functionality to a reduced functionality;
    in response to receiving the request, create and assign an ad hoc password to the IoT device;
    upon or after receiving the request, remotely changing a profile on an eSIM card embedded in the IoT device by transmitting to the IoT device a command to at least partially inhibit the functionality of the IoT device;
    transmitting to the IoT device the ad hoc password to the IoT device, wherein the ad hoc password, if received at a subsequent time by the IoT device, allows the IoT device to return to full functionality; and
    receiving a geolocation from the IoT device in response to the transmitting of the command.

9. The one or more non-transitory computer-readable media of claim 8, wherein the instructions are further executable by the processor of the network element to cause the flow controller of the network element to perform a further operation comprising:
    receiving a response from the IoT device acknowledging that the IoT device has executed the command to at least partially inhibit the functionality of the IoT device.

10. The one or more non-transitory computer-readable media of claim 8, wherein the instructions are further executable by the processor of the network element to cause the flow controller of the network element to perform a further operation comprising:
    transmitting the geolocation to the client device.

11. The one or more non-transitory computer-readable media of claim 8, wherein the instructions are further executable by the processor of the network element to cause the flow controller of the network element to perform a further operation comprising:
    determining if the IoT device is moving; and
    in response to determining that the IoT device is moving, transmitting a message to the client device that indicates motion of the IoT device.

12. The one or more non-transitory computer-readable media of claim 8, wherein the command and the ad hoc password are transmitted substantially simultaneously to the IoT device.

13. The one or more non-transitory computer-readable media of claim 8, wherein the network element comprises a portion of a wireless communication network.

14. A computer-implemented method comprising:
   receiving, from a remote server, a command to remotely change a profile on an eSIM card embedded in a remote device to reduce full functionality of the remote device by at least partially inhibiting functionality of the remote device;
   receiving at a first time, from the remote server, an ad hoc password to be assigned to the remote device, wherein the ad hoc password is created in correspondence to the command;
   storing the ad hoc password;
   executing the command to at least partially inhibit the functionality of the remote device, wherein the ad hoc password, if received at a second or subsequent time by the remote device, allows the remote device to return to full functionality; and
   transmitting a geolocation to the remote server in response to returning to full functionality.

15. The computer-implemented method of claim 14, wherein the command and the ad hoc password are received together from the remote server.

16. The computer-implemented method of claim 14, further comprising:
   determining if the remote device is moving; and
   in response to determining that the remote device is moving, transmitting a message to the remote server that indicates motion of the remote device.

17. The computer-implemented method of claim 14, wherein the at least partially inhibiting the functionality of the remote device comprises locking the device.

18. The computer-implemented method of claim 14, wherein the remote server comprises a portion of a wireless communication network.

19. The computer-implemented method of claim 14, wherein the remote device comprises an Internet of Things (IoT) device.

20. The computer-implemented method of claim 14, further comprising:
   detecting motion;
   self-locking the remote device in response to the detecting motion;
   self-assigned a password in response to the self-locking; and
   transmitting to the remote server
      an indication that the IoT device is moving,
      an indication that the IoT device has self-locked, and
      the self-assigned password.

\* \* \* \* \*